Figure 1:
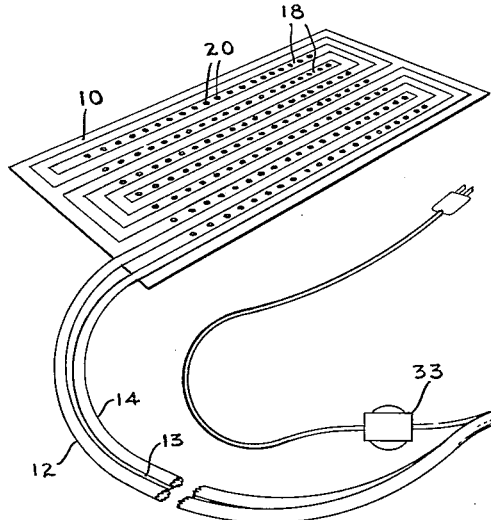

May 2, 1961

C. D. MacCRACKEN 2,982,841

IMPROVED HEATING AND TEMPERATURE CONTROL METHOD
AND APPARATUS FOR PERSONAL THERMAL SYSTEMS

Filed June 25, 1954

2 Sheets-Sheet 1

INVENTOR.
CALVIN D. MacCRACKEN.
BY
James M. Relph
ATTORNEY

INVENTOR.
CALVIN D. MacCRACKEN

United States Patent Office 2,982,841
Patented May 2, 1961

2,982,841

IMPROVED HEATING AND TEMPERATURE CONTROL METHOD AND APPARATUS FOR PERSONAL THERMAL SYSTEMS

Calvin D. MacCracken, Tenafly, N.J., assignor to Jet-Heet, Inc., Englewood, N.J., a corporation of New York Filed June 25, 1954, Ser. No. 439,187

6 Claims. (Cl. 219—39)

This invention relates to improvements in heating units, and particularly to an improved heating unit for a personal heating device in which heated liquid is circulated through a flexible panel to warm a person's body in contact with the panel, as well as a novel method of operation and control of such units.

In a co-pending application of Calvin D. MacCracken, filed July 20, 1953, Serial Number 369,198, now Patent No. 2,885,189, assigned to the assignee of the present invention, there is described and claimed a personal thermal device of the general type with which the present invention is concerned. In the apparatus described in the foregoing co-pending application, a motor driven pump is utilized to circulate liquid through a flexible, multi-channel heat exchange panel which is adapted to be used as a pillow insert, a mattress pad or the like. Upon circulation of liquid through the panel, the user's body is either warmed or cooled by receiving heat from or losing heat to the circulating liquid, depending on the liquid temperature.

In the specific embodiment disclosed in the above-mentioned application, heat is supplied when needed by an electric heating element of the so-called "immersion type" which extends into a container on which the pump is mounted. The supply of heat is controlled by a manual switch in the electric circuit.

While the foregoing arrangement is satisfactory under some conditions of use, it has certain limitations that it is the general object of the present invention to overcome.

For one thing, there is always the possibility that the heating element will be turned on inadvertently when there is no liquid in the system. If this happens, of course, the heating element is quite likely to overheat and cause damage to itself and associated parts of the apparatus. Similarly, if a stoppage occurs in the liquid conducting circuit, the liquid trapped in the container may become overheated with possible damage resulting.

A further shortcoming of the above-mentioned apparatus is that a simple manual control switch requires more or less constant attention of the user to maintain the desired temperature at the heating panel. Even if provided with a number of graduated temperature settings (e.g., "low," "medium" and "high"), under changing conditions any given temperature selected will be unsatisfactory. Also, with a relatively large volume liquid reservoir, the system is rather slow to warm up or cool off.

It is, accordingly, among the objects of the present invention to provide a system of the foregoing type in which the temperature of the circulating liquid is controlled automatically in accordance with temperature conditions existing at the panel, and in which the apparatus is protected against damage due to overheating in the event of failure of the circulating pump, loss of the heat-exchange liquid or the like. A related object is the provision of an improved method of temperature control.

In accordance with a preferred embodiment of the invention, the foregoing and other related objects and advantages are attained in a heating unit for a liquid-circulation-type personal heating system which includes a chamber wherein the liquid is heated by an electric heating element in heat-exchange relation with the chamber wall. A temperature-sensitive switch in the heater circuit is connected to control the supply of current to the heater as a function of chamber wall temperature. With this arrangement, not only is the temperature of the circulating liquid continuously monitored through its effect on the chamber wall temperature, but also any tendency toward overheating can instantly be detected and avoided because of the close association of the temperature detector and the source of heat.

Figure 2:
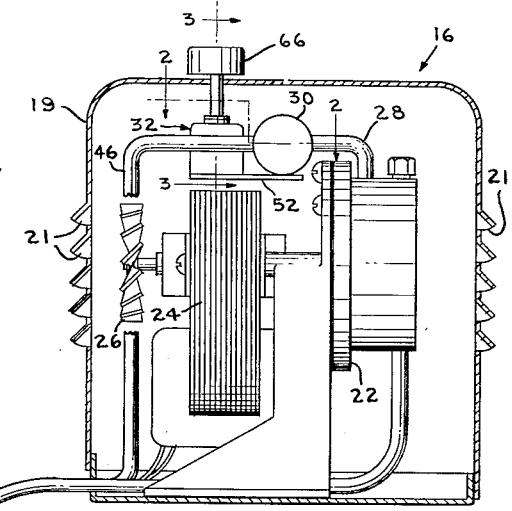
Figure 2:
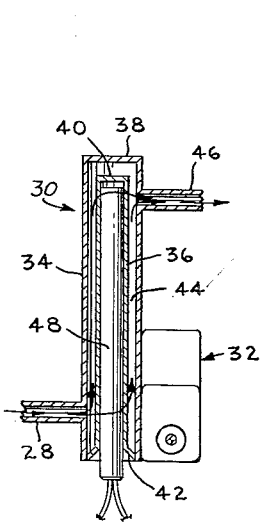
Figure 3:
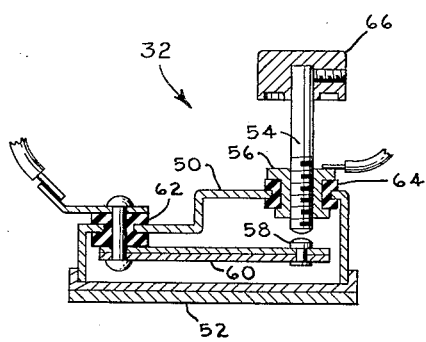
Figure 4:
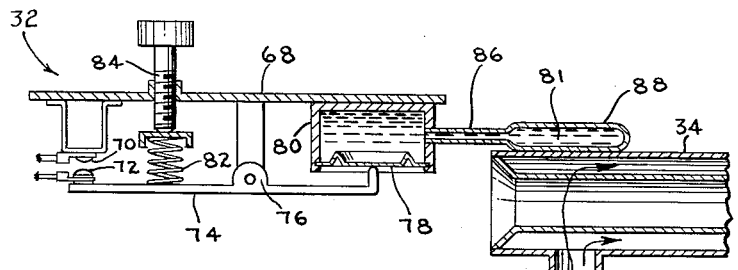
Figure 5:
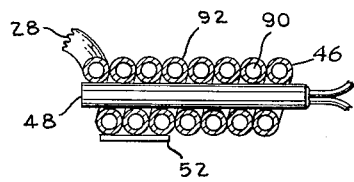
Figure 6:
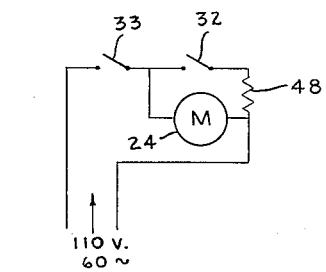
Figure 7:
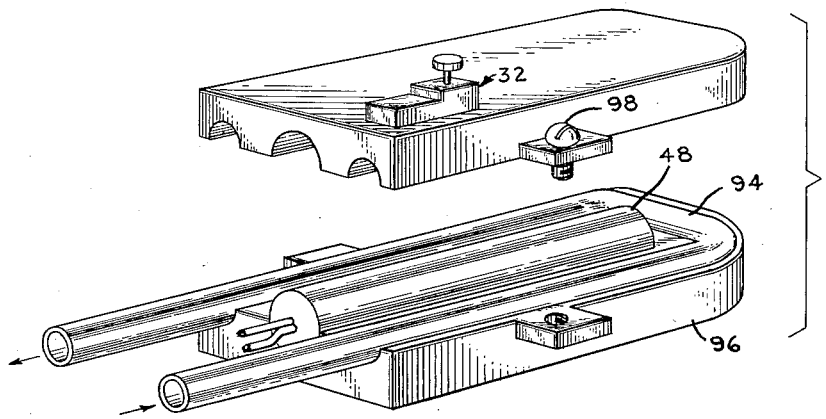

A more complete understanding of the invention, and of further objects and features thereof, can be had by reference to the following description of illustrative embodiments thereof, when considered in connection with the accompanying drawing, wherein Figure 1 is a diagram of a personal heating system embodying the invention, with the heat exchange panel being shown in perspective and the circulator being shown in elevational view with the housing in section, Figure 2 is a section view of the heat exchanger in the system of Figure 1, taken on the line 2—2 in Figure 1, Figure 3 is an enlarged section view of the temperature control switch in the system of Figure 1, taken on the line 3—3 in Figure 1, Figure 4 is a section view of an alternative form of temperature control suitable for use in the system of Figure 1, Figure 5 is a section view of an alternative form of heat exchanger suitable for use in the system of Figure 1, Figure 6 is a wiring diagram for the system of Figure 1, and Figure 7 is a perspective view of a further form of heat exchanger embodying the invention.

Referring to Figure 1 of the drawing, a personal heating system embodying the invention is shown to include a flexible, liquid-conducting panel 10 coupled by a pair of flexible tubes 12, 14 to a circulating and heating unit 16.

For illustrative purposes the panel 10 is shown to comprise two superposed sheets of waterproof material, such as one of the vinyl plastics, sealed together along the outside edges and along spaced lines 18 to define passages between the seal lines through which liquid can be circulated. In some instances, the seal lines may be provided with many small perforations 20 to prevent accumulation of perspiration or other moisture on the panel surface, although such perforations may not be required where the panel is used under a mattress pad, for example. It may be noted that the panel can be made in a variety of shapes and sizes, depending on the particular purpose for which it is used. For example, one very beneficial use is as a pillow insert, the panel being of a suitable size to be placed on the pillow body under the pillowcase, to warm or cool the user's head as conditions require. In a larger size, the panel may be used to warm or cool substantially the entire body of the user, being located for this purpose on the mattress of a bed, as previously mentioned, or spread over the seat of an automobile. A panel of similar size has further utility as the floor pad or floor mat in a child's playpen. Alternatively, the panel may comprise a fabric structure with concealed tubing providing the passages. Whatever its construction or location, the panel 10 will carry heat away from or supply heat to the user's body, depending on the relative temperature of the liquid circulated through the passages. While the present invention primarily is concerned with controlling the apparatus when the circulating liquid is to be heated, it will be understood that the control system described hereinafter will in no wise interfere with use of the apparatus for cooling purposes. Accordingly, the coupling tubes 12, 14 preferably are made relatively long, say of the order of eight feet, to provide ample heat dissipating surface for cooling the circulating liquid if desired. When used for heating, the coupling lines can be coiled up and placed in an insulated bag or the like, or otherwise covered to reduce heat losses. For convenience in handling, the coupling tubes preferably are joined by a central web 13.

The circulating and heating unit 16 is enclosed in a housing 19 having louvered openings 21 for ventilation. Inside the housing, one of the tubes (12) is connected to the inlet of a circulator, such as a centrifugal pump 22 driven by a motor 24. A fan 26 preferably is mounted on the motor shaft to draw air over the motor and prevent it from overheating. For simplicity, details of the pump and motor are omitted, as they form no part of the present invention per se. A preferred type of pump is shown in a co-pending application of Calvin D. MacCracken et al., filed concurrently herewith, Serial No. 439,206, now abandoned in favor of Application Serial No. 804,843 assigned to the assignee of the present invention. In general, any pump other than a constant displacement pump is suitable. A constant displacement pump, such as a gear pump, is likely to build up sufficient pressure to rupture a coupling line or the panel itself if a stoppage occurs in the liquid circuit.

The outlet side of the pump is connected by a tube 28 to a heat exchanger 30 wherein the system liquid can be heated to any selected temperature, as determined by the setting of a thermostatic control 32 which includes a temperature-controlled switch, described hereinafter.

As shown in Figure 2, a preferred form of heat exchanger comprises a pair of cylinders 34, 36 of unequal length and radius, placed one within the other and each closed at one end walls 38, 40. At the opposite end, the two cylinders 34, 36 are joined by a disc or spacer 42, thereby defining between the cylinders an annular chamber 44. Inlet and outlet tubes 28, 46 at opposite ends of the outer cylinder communicate the chamber 44 with the pump outlet and with the coupling tube 14, respectively.

Inside the inner cylinder 36 is placed an electric heating element 48 of cylindrical shape, fitting snugly in the cylinder 36 to insure efficient heat transfer to the liquid in the chamber 44. Current for the heating element 48 is supplied through an electric circuit (Figure 6) which includes the temperature-controlled switch of the thermostatic control 32, said switch being connected in series with the heating element 48. The heater circuit is in parallel with the motor 24, both being controlled by a main switch 33.

As best shown in Figure 3, the thermostatic control includes a housing 50 which is mounted on a heat conducting plate 52 contacting the outside wall of the heat exchanger 30. The switch elements comprise an adjustable contact in the form of a screw 54 threaded in an insert 56 in one wall of the housing 50, and a movable contact 58 carried by a strip of bimetal 60. The bimetal strip is supported on and separated from the housing wall by an insulator 62, while a similar insulator 64 serves the same function for the screw contact 54.

The bimetal strip 60, being composed of layers of metal having dissimilar coefficients of thermal expansion, has the customary characteristic of bending or flexing in response to temperature changes, thereby to move the contact 58 toward and away from the screw 54. The exact temperature at which the contacts will come together can be varied by rotating the screw 54 by means of the knob 66. Thus, the flow of current to the heating element 48 through the switch of the thermostatic control 32 will depend on the setting of the screw 54 and the temperature inside the housing 50.

By mounting the housing 50 of the thermostatic control 32 and the heating element 48 in heat-conductive relation to the wall 34 of the heat exchanger chamber in the manner shown, two important results are obtained. For one thing, as long as liquid flows through the chamber 44, the temperature of the chamber wall 34 will follow very closely that of the circulating liquid, thereby giving an accurate and continuous monitoring of temperature conditions at the panel. A change in temperature at the panel, whether due to an ambient change or any other factor, will quickly be reflected in the temperature of the liquid returning from the panel. As the temperature of the chamber wall 34 changes, the switch of the thermostatic control 32 will open or close to interrupt or initiate the flow of heating current to the heater 48. Furthermore, if the temperature of the heat exchanger wall 34 should tend to increase beyond a safe limit for any reason, the switch will sense such a condition and turn off the heating current long before any damage is done. This is particularly important for protection of the heating element 48 itself, as such elements ordinarily are designed to operate satisfactorily only if the heat generated is carried away fairly rapidly. For example, if the liquid should be lost from the system through a leak, or if a stoppage in the circulation path should develop, the temperature quickly would begin to rise abnormally as the flow of liquid stops since there is no way for the heat to be dissipated. This temperature rise would immediately cause the switch of the thermostatic control 32 to open, thereby cutting off the supply of heater current to protect the heater itself and associated parts.

Another important consideration in some applications is the selection of the temperature which is to serve as the system control parameter.

By way of introduction, it may be noted that, when heat is being supplied, the temperature rise across the heat exchanger in the heat unit will correspond to the drop across the heat exchange panel and connecting tubes when the system becomes stabilized. When some change occurs (normally, a change in ambient) to cause a change in the temperature drop across the panel, it is intended that the thermostat will sense and respond to this change, as reflected primarily in a change in liquid temperature, to increase or decrease the cycling rate of the heater so that the heat unit temperature rise and the panel temperature drop again will come into equilibrium. Of course, the thermostat can be suitably arranged to respond to the liquid temperature at any point in the heat unit section of the circuit, varying all the way from the minimum temperature (which will occur at the heat exchanger inlet 28) to the maximum temperature (which will occur at the heat exchanger outlet 46).

At first impression, it might be thought that the average heat exchanger temperature would be the best control temperature, for this would result in maintaining a substantially constant average panel temperature. Thus, for the sake of discussion, it can be assumed that in an ambient of 65° F., the temperature drop across the panel might be 10° F., with the liquid entering and leaving the panel at, say, 90° F. and 80° F., respectively, giving an average panel temperature of 85° F. A corresponding temperature rise of 10° F. would be required across the heat exchanger, and the average heat exchanger temperature would be 85° F. Accordingly, if the thermostat is arranged to respond to average heat exchanger temperature, it would be set to turn the heater off at average heat exchanger temperatures above 85° F., and on at lower temperatures.

Assume that the ambient temperature drops to, say, 50° F. Now the temperature drop across the panel would increase due to increased heat loss, but the average temperature would still be held at 85° F. With, say, a twenty degree drop across the panel (and corresponding twenty degree rise across the heat exchanger at equilibrium), for example, the maximum and minimum temperatures would become 95° F. and 75° F., respectively, but the average temperature would remain the same at 85° F.

It has been found that a constant average temperature arrangement of this kind is not entirely satisfactory.

While the reason for this is not definitely established, a possible theory is that as the ambient temperature decreases, the body loses more heat from exposed parts (primarily the head) and also loses more heat in breathing colder air. Therefore, if a constant average panel temperature is maintained with changing ambient, the user is not necessarily kept warm enough at the lower ambients. What is required is that the average panel temperature increase with decreasing ambient; in other words, that the panel temperature should vary in such fashion as to overcompensate for ambient changes.

By arranging the thermostat control 32 to respond to a temperature lower than the average system liquid temperature, the desired result can be achieved. Maximum overcompensation will be had when the minimum system liquid temperature is used as the control parameter. Using the assumed figures previously given, for example, the thermostat could be set to respond to and maintain a minimum system temperature of 80° F. In the 65° F. ambient, panel temperature conditions would be as before, going from 80° F. to 90° F., for an average of 85° F., because the thermostat will cause the heater to come on at all liquid temperatures below 80° F. However, at 50° F. ambient, the twenty degree spread would be from 80° F. to 100° F., giving an average panel temperature of 90° F.; a 5° increase.

Where less than maximum overcompensation is desired, the heater control can be located and arranged to respond to a liquid temperature higher than the minimum temperature of the liquid in the system but below the average heat unit heat exchanger temperature.

In other words, in accordance with the method of the present invention, it is contemplated that the temperature of the circulating liquid be controlled as a function of a measured liquid temperature at some point below that at which one half of the total temperature rise across the heat unit heat exchanger has been reached.

For example, as shown in Figure 2, to obtain the maximum ambient overcompensation, the thermostat control 32 preferably is located on the conducting plate 52 at the low temperature end of the heat exchanger, adjacent the inlet 28, so that the thermostat will respond to the lowest temperature of the system liquid during circulation. Of course, if circulation is interrupted for any reason, this location of the thermostat on the conducting plate will not materially affect the protection afforded the heater unit. For less-than-maximum overcompensation, the thermostat can be moved closer to the outlet portion of the heat exchanger, up to the point at which the heat exchanger temperature is halfway between maximum and minimum.

While the type of thermostatic control shown in Figure 3 is deemed preferable for its simplicity, it will be evident that other types of temperature sensitive switching devices can be used within the purview of the invention. For example, there is shown in Figure 4 an alternative type of thermostatic control that is equally suitable from a functional standpoint.

The thermostatic control in Figure 4 comprises a panel 68 having a fixed contact element 70 mounted at one end thereof. A movable contact 72 is carried by rocker arm 74 supported from the panel 68 on a pivotal mounting 76. At its other end, the rocker arm 74 contacts the face of a flexible diaphragm 78 which forms one wall of a housing 80 mounted on the panel 68. Adjacent the contact 72 on the rocker arm, a compression spring 82 extends from the arm 74 to a compression-adjusting screw 84 threaded in the panel 68.

In this case, the temperature-responsive actuator comprises an expansible liquid 81. The actuator housing comprises the diaphragm housing 80 together with a tube 86 which leads to a bulb 88 mounted on the wall 34 of the heat exchanger adjacent the inlet 28 so that the liquid 81 in the bulb, tube and housing will expand and contract in response to changes in the minimum temperature of the heat exchanger wall 34 as transmitted to the liquid 81 through the bulb 88.

As the liquid 81 expands and contracts, the diaphragm 78 will flex to move the arm 74 thereby moving the contact 72 toward and away from the fixed contact 70 to make and break the electric circuit. The temperature at which the two contacts 70, 72 will engage can be adjusted as desired by rotating the screw 84 to vary the compression of the spring 82, and, hence, the liquid pressure required to move the diaphragm 78. Thus, the switch actuator liquid 81 will control the switch in accordance with the heat exchanger surface temperature, just as does the bimetal actuator in the thermostatic control shown in Figure 3.

In Figure 5 there is shown an alternative form of heat exchanger equally suitable for use in the heat unit of the present invention. In this case, the heat exchange chamber comprises the bore 90 of a metal tube 92 wound helically about the heater element 48 and contacting the heat conducting plate 52 on which the thermostatic control 32 (not shown in Figure 5) is mounted. It will be understood that the opposite ends of the heat exchange tube 92 will be connected to the pump outlet 28 and to the connecting tube 46.

Another alternative arrangement of the heat exchanger is shown in Figure 7, wherein a U-shaped section of tubing 94 is embedded in a two-piece metal block 96 on which the housing of the thermostatic control 32 is mounted. In this case, the heater cartridge 48 is inserted in a cavity in the center of the block. Of course, the block provides a heat conductive path between the heater 48, the heat exchange tube 94 and the switch of the thermostatic control 32. The two sections of the block are held together by screws 98 or the like.

I claim:

1. In a personal thermal device of the type comprising a liquid circuit including a liquid conducting, flexible, heat-exchange panel and a circulator for circulating liquid through said circuit, the improvement which comprises a heat unit for heating said liquid and for controlling the supply of heat to said liquid, said heat unit comprising walls defining an elongated chamber in said circuit within which to heat liquid, said elongated chamber having an inlet near one end connected to said panel for receiving liquid returning from said panel and having an outlet spaced from said inlet, said outlet being connected to said panel for supplying warmed liquid to said panel, an electrically energized heating element in contacting heat-exchange relation with at least one of said chamber walls, said heating element having substantial length and extending along at least one of said walls from an area near to said inlet to an area near to said outlet for supplying heat to said liquid through said one wall, an electric circuit including a switch connected in series with said heating element for controlling the supply of electric current to said heating element, a temperature-responsive actuator coupled to said switch for opening and closing said switch, said temperature-responsive actuator being positioned externally of said chamber, and thermally conductive means connecting said actuator and one of said chamber walls at a point spaced from said inlet and nearer said inlet than said outlet, whereby said actuator is responsive to the temperature of the liquid which is being heated within said chamber and also is directly responsive to the temperature of the chamber walls for quickly opening said switch if the heating element begins to overheat.

2. In a personal thermal system of the class wherein a pump circulates an electrically heated liquid through a liquid-conducting circuit including a flexible heat exchange panel remote from the pump adapted to be placed in heat exchange relationship with the user and when the liquid becomes sufficiently heated a temperature-responsive actuator of an electric switch becomes effective to open the switch and interrupt the heating current, the combination with said actuator and switch of a liquid heating unit for heating said liquid and for controlling the operation of said switch, said heating unit comprising a pair of cylinders of unequal length and radius placed one within the other and end walls cooperating with said cylinders to define an annular liquid-conducting chamber, a cylindrical, electrically-heated heating element inside the inner one of said cylinders, an electric circuit for supplying current to said heating element and including the electric switch, a housing enclosing said actuator, and heat-conductive means connecting the outer one of said cylinders to said housing, whereby to control said actuator as a function of the temperature of said outer cylinder, thereby controlling the temperature of the liquid and also preventing damage to the cylindrical heating element from overheating.

3. Method of regulating the temperature of a personal thermal device of the type comprising a liquid circuit including a flexible, liquid-conducting panel and a circulator for circulating liquid through said circuit, said method producing overcompensation for changes in ambient temperature thereby to maintain the user of said panel comfortable, said method comprising the steps of conducting the liquid along a confined elongated path supplying heat to the circulated liquid at all points along said confined elongated path, and controlling the amount of heat supplied to said liquid as a function of the temperature of said liquid at a point along said path where the temperature normally is within the lower half of the range of temperatures along said path from one end to the other.

4. In a personal thermal system of the type including a flexible heating panel adapted to be placed in heat exchange relationship with the human body and having liquid-conducting passages therein, a liquid circulator for circulating heated liquid through said panel, and liquid-circuit defining means providing a liquid circuit including said panel and said liquid circulator, the improvement which comprises improved heating and control apparatus automatically providing overcompensation for changes in ambient temperature, said improved heating and control apparatus including an electrical resistance heating element, an electrical circuit for energizing said resistance element, a switch in said electrical circuit for controlling the energization of said resistance element, wall means in direct heat exchange relationship with said heating element, said wall means defining an elongated chamber providing a predetermined liquid-flow path included in said liquid circuit and having an inlet into which liquid is returned from said panel and an outlet from which warmed liquid is supplied to said panel, with said flow path passing through said elongated chamber from said inlet to said outlet, said resistance element having length in a direction generally parallel with said liquid-flow path, the liquid in said flow path being heated by said resistance element and having a minimum temperature at said inlet, a maximum temperature at said outlet and a progressively rising temperature along said path, the temperature of said wall means also progressively increasing along said flow path, and a thermally-responsive actuator for said switch primarily responsive to the temperature of said wall means at a point along said path after said inlet and before that point at which one half of the total temperature rise occurs, whereby automatic over-compensation for changes in ambient temperature at said panel and also protection from overheating of said heating element are provided.

5. In a personal thermal system of the type including a flexible heating panel adapted to be placed in heat exchange relationship with the human body and having liquid-conducting passages therein, a liquid circulator for circulating heated liquid through said panel, and liquid-circuit defining means providing a liquid circuit including said panel and said liquid circulator, the improvement which comprises improved heating and control apparatus automatically providing overcompensation for changes in ambient and providing safety against overheating, said improved heating and control apparatus including an electrical resistance heating element, an electrical circuit for energizing said resistance element, a switch in said electrical circuit for controlling the energization of said resistance element, heat-conducting walls heated by said resistance element and defining a liquid heater having an inlet for receiving liquid flowing from said panel and an outlet for supplying heated liquid to said panel and a predetermined liquid flow path passing through said heater from said inlet to said outlet, said resistance element being elongated in a direction generally parallel with said liquid-flow path, said liquid flow path being included in said liquid circuit and heating the liquid for circulation through said passages in the panel, the liquid flowing along said flow path having a minimum temperature at said inlet, a maximum temperature at said outlet and a progressively rising temperature along said path, and a thermally-responsive actuator for said switch responsive primarily to the temperature of said walls at a position beyond said inlet and before that point at which one half of the total temperature rise occurs, whereby automatic over-compensation for changes in ambient temperature at said panel is provided and whereby said thermally-responsive actuator safely limits the energization of said resistance element to prevent undue rise in temperature of said walls and of said heating element.

6. In a personal thermal device of the type comprising a liquid circuit including (1) a liquid conducting, flexible, heat-exchange panel through which to circulate liquid, (2) a pump for circulating liquid through said circuit, and (3) supply and return lines connecting said pump to said panel, the improvement which comprises a heat exchanger comprising walls defining a liquid-conducting chamber in said circuit and having an inlet for receiving liquid from said panel and an outlet for supplying heated liquid to said panel, an elongated electrical heating element extending along at least one of said walls from a region near said inlet to a region near said outlet in heat exchange contact therewith and an electrical supply circuit for said element including a heat-responsive switch for opening and closing said electric circuit, said switch having a heat-sensitive actuator in heat exchange relation to said walls, said actuator being primarily responsive to the temperature of said walls, at a point removed from said inlet and removed from said outlet, whereby said actuator normally controls the temperature of the liquid, but also responds directly to undue increase in the temperature of the walls to prevent overheating of the heating element.

References Cited in the file of this patent

UNITED STATES PATENTS

| 1,121,277 | Mitchell | Dec. 15, 1914 |
| 1,896,953 | Hassell | Feb. 7, 1933 |
| 1,903,924 | Irwin | Apr. 18, 1933 |
| 2,022,728 | Lieberherr | Dec. 3, 1935 |
| 2,057,309 | Persons | Oct. 13, 1936 |
| 2,190,384 | Newman | Feb. 13, 1940 |
| 2,203,425 | Welch | June 4, 1940 |
| 2,257,887 | Osterheld | Oct. 7, 1941 |
| 2,296,325 | Bak | Sept. 22, 1942 |
| 2,437,453 | Belgau | Mar. 9, 1948 |
| 2,443,359 | Newhouse | June 15, 1948 |
| 2,480,302 | Pankow | Aug. 30, 1949 |
| 2,602,875 | Behm | July 8, 1952 |
| 2,753,435 | Jepson | July 3, 1956 |